United States Patent
Harayama et al.

(10) Patent No.: US 9,508,963 B2
(45) Date of Patent: Nov. 29, 2016

(54) BATTERY AND METHOD FOR PRODUCING SAME

(71) Applicant: TOYOTA JIDOSHA KABUSHIKI KAISHA, Toyota-shi, Aichi (JP)

(72) Inventors: Takashi Harayama, Toyota (JP); Yoichi Naruse, Nagoya (JP); Satoshi Suzuki, Toyota (JP); Hiroyuki Nakayama, Toyota (JP); Toshiya Okada, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/408,596

(22) PCT Filed: Apr. 24, 2013

(86) PCT No.: PCT/JP2013/061988
§ 371 (c)(1),
(2) Date: Dec. 17, 2014

(87) PCT Pub. No.: WO2014/002598
PCT Pub. Date: Jan. 3, 2014

(65) Prior Publication Data
US 2015/0200386 A1    Jul. 16, 2015

(30) Foreign Application Priority Data
Jun. 27, 2012   (JP) .................................. 2012-144377

(51) Int. Cl.
B23K 26/20   (2014.01)
H01M 2/08   (2006.01)
H01M 2/02   (2006.01)
H01M 2/04   (2006.01)
H01M 2/20   (2006.01)
H01M 2/30   (2006.01)

(52) U.S. Cl.
CPC ............. *H01M 2/08* (2013.01); *H01M 2/0217* (2013.01); *H01M 2/0426* (2013.01); *B23K 26/20* (2013.01); *H01M 2/20* (2013.01); *H01M 2/30* (2013.01)

(58) Field of Classification Search
CPC .. H01M 2/08; H01M 2/0217; H01M 2/0426; B23K 26/20
See application file for complete search history.

(56) References Cited

FOREIGN PATENT DOCUMENTS

JP    S63-146344 A    6/1988
JP    H1-115052 A    5/1989
(Continued)

OTHER PUBLICATIONS

B.H. Kim et al: "Effects of Weaving Laser on Weld Microstructure and Crack for Al 6k21-T4 Alloy", Journal of Materials Science & Technology, vol. 27, No. 1, Jan. 1, 2011, pp. 93-96, XP055181003, ISSN: 1005-0302, DOI: 10.1016/S1005-0302(11)60031-5.

*Primary Examiner* — Ula C Ruddock
*Assistant Examiner* — Thomas Parsons
(74) *Attorney, Agent, or Firm* — Sughrue Mion, PLLC

(57) ABSTRACT

A battery houses an electrode body inside a battery case including a bottomed cylindrical case body having an opening part, and a plate-like lid member inserted in the opening part so as to seal the opening. The opening part and a lid peripheral edge part are welded hermetically by an energy beam irradiated from outside in the thickness direction of the lid member. In a specific section, the inner peripheral surface of the opening part and the peripheral edge surface of the lid peripheral edge part are welded in close contact with each other. A bead at the specific section takes a fan shape having a central angle of 160 to 200 degrees in a cross section, and the center of the fan shape is positioned on the inner peripheral surface and the peripheral edge surface.

4 Claims, 6 Drawing Sheets

(56) References Cited

FOREIGN PATENT DOCUMENTS

| | | | |
|---|---|---|---|
| JP | H1-286249 | A | 11/1989 |
| JP | 2001-155698 | A | 6/2001 |
| JP | 2004-235082 | A | 8/2004 |
| JP | 2011-204396 | A | 10/2011 |

BATTERY AND METHOD FOR PRODUCING SAME

CROSS-REFERENCE TO RELATED APPLICATIONS

This is a US national phase application based on the PCT International Patent Application No. PCT/JP2013/061988 filed on Apr. 24, 2013, and claiming the priority of Japanese Patent Application No. 2012-144377 filed on Jun. 27, 2012, the entire contents of which are herewith incorporated by reference.

TECHNICAL FIELD

The present invention relates to a battery and a method for producing the battery and particularly to a battery and a method for producing the battery by welding a case body of a battery case and a lid member to each other.

BACKGROUND ART

Batteries such as lithium ion secondary batteries are used in various fields; for example, in vehicles such as hybrid vehicles, plug-in hybrid vehicles, and electric vehicles, home electric appliance such as note-sized personal computers, and industrial equipment such as impact drivers. As one example of this type of battery, there is known a battery configured such that an electrode body is housed in a metal case, concretely, a rectangular battery provided with a bottom-closed rectangular cylindrical case body and a lid member inserted in an opening part of the case body and welded thereto by laser to close the opening part (see each figure of Patent Document 1).

RELATED ART DOCUMENTS

Patent Documents

Patent Document 1: JP-A-2001-155698

SUMMARY OF INVENTION

Problems to be Solved by the Invention

However, when the case body and the lid member are laser-welded in such a manner, a bead (a wed bead) composed of metal that was melted during welding and then solidified may contain residual closed pores (voids). If a closed pore is left in the bead, when stress is applied to the battery case, e.g., when internal pressure of the battery case rises, the closed pore is apt to become a weak point in the bead. For example, the closed pore may induce cracks to initiate or generate cracks as if connecting the closed pore to gaps formed between the case body and the lid member and further allow the cracks to grow via the closed pore.

The closed pores (voids) are conceived as being formed by gradual accumulation, in the molten metal, of hydrogen contained in the metal (e.g., aluminum) forming the case body and the lid member, hydrogen deriving from dissociation of the air taken in during welding or the moisture contained in sealed gas at high temperature associated with laser irradiation, and others. Specifically, the solubility of hydrogen in molten metal is greatly lower than the solubility of hydrogen in solid metal. When the metal melts, it cannot retain hydrogen therein, so that the hydrogen is likely to form bubbles. As the bead is cooled and become gradually solidified, hydrogen and others contained in the form of fine bubbles in the molten metal move to a portion remained molten, finally accumulate in or around a portion lastly solidified, and thus form closed pores in the bead.

The present invention has been made in view of the above circumstances and has a purpose to provide a battery in which a lid member is inserted in an opening part of a case body of a battery case and they are welded in a hermetically sealing manner by an energy beam over the entire circumference of the lid member so that bead being less likely to contain closed pores and providing high weld strength is formed, and a method for producing the battery.

Means of Solving the Problems

To achieve the above purpose, one aspect of the invention provides a battery including a metal battery case and an electrode body housed in the battery case, the battery case including; a case body having a closed-bottom cylindrical shape having an opening; and a plate-like shaped lid member inserted in the opening to close the opening, the opening of the case body and a lid peripheral edge part on a peripheral edge of the lid member being hermetically welded to each other over an entire circumference of the lid member by an energy beam irradiated from outside in a thickness direction of the lid member, wherein in a specific section forming at least a part of the lid member in a circumferential direction, an inner peripheral surface of the opening of the case body, extending in the thickness direction and a peripheral edge surface of the lid peripheral edge part of the lid member, extending in the thickness direction are welded in close contact with each other, a bead in the specific section has a shape like a fan having a central angle of 160 to 200° in cross section perpendicular to the circumferential direction of the bead, and a center of the fan shape is located on the inner peripheral surface and the peripheral edge surface.

In the aforementioned battery, in the specific section, the bead has the fan shape having the central angle θ=160 to 200°, that is, a nearly semicircular shape in cross section, and the center (a pivot portion of the fan shape) is located on the inner peripheral surface and the peripheral edge surface that are not melted yet and are in close contact with each other. Thus, the following welding action is conceived. Specifically, when the energy beam is relatively moved to perform welding between the case body and the lid member, the heat received therein also conducts to the unmelted portions of the opening part of the case body and the peripheral edge part of the lid member, causing temperature rise thereof. It is accordingly conceived that when the molten bead formed by the energy beam irradiation is being cooled and gradually solidified, the heat relatively less moves by heat conduction from the molten bead to the case body or the lid member, and much heat conducts from the surface of the molten bead to air or shield gas contacting therewith or much heat dissipates from the surface of the molten bead due to heat emission by infrared rays. In addition, the bead (molten metal) has the fan-like shape having a nearly semicircular cross section. Therefore, the bead gets cooled almost uniformly from its outer peripheral surface side and progressively becomes solidified from the outer surface having a circular-arc cross section toward the center of the fan shape. In association therewith, fine bubbles of hydrogen and others contained in the molten metal are also caused to move toward the fan-shape center and then finally accumulate at or near the fan-shape center.

In the aforementioned battery, therefore, the fan-shape center is located on the inner peripheral surface of the opening part of the case body and the peripheral edge surface of the lid peripheral edge part of the lid member. Even though the inner peripheral surface of the opening part of the case body and the peripheral edge surface of the lid peripheral edge part of the lid member are held in close contact, they form therebetween a slight plate-like space communicating with the internal space of the battery case. Thus, the hydrogen and others contained in the fine bubbles are released into the plate-like space and then into the internal space of the battery case therethrough. Consequently, a closed pore is unlikely to be formed by the hydrogen and others in the fan-shaped bead.

Even if the hydrogen and others contained in the fine bubbles are not sufficiently released into the plate-like space, the fan-shape center of the bead is located on the inner peripheral surface and the peripheral edge surface. At the stage when the fine bubbles accumulate at or near the center, forming a large bubble, this large bubble is communicated with the plate-like space mentioned above. Specifically, the large bubble formed of the fine bubbles forms an open pore continuous with the plate-like space and communicating with the inside of the battery case through the plate-like space. This open pore is less likely to induce cracks to be generated therefrom, differently from the aforementioned closed pore formed in the bead. Rather, in the bead having such open pore, a nearly round cutout is formed by the open pore at an end edge of the plate-like space apt to become a start point from which a crack is induced to initiate. Accordingly, when the battery is subjected to the stress leading to separation of the inner peripheral surface and the peripheral edge surface held in close contact relation, it is easier to disperse the stress and prevent the generation of cracks from the end edge of the plate-like space. That is, conversely, the open pore makes it difficult to generate cracks. This battery can therefore be configured such that the specific section is less likely to include the closed pore liable to induce the generation of cracks therefrom in the bead and provide high weld strength.

As the energy beam used for welding, there are a laser beam and an electronic beam. The laser beam is selectable from a CW laser such as a fiber laser and a pulse laser such as a YAG laser. In consideration of uniformity of weld spreading depth in a circumferential direction and others, the CW laser such as a fiber laser is preferably used.

In the aforementioned battery, the bead in the specific section is configured to protrude more outward than an outside surface of the case body and protrude more outward than an outside surface of the lid member.

In this battery, in the specific section, the bead is formed in the fan-like shape as mentioned above and designed to protrude more outward than the outside surface of the case body and protrude more outward than the outside surface of the lid member. Accordingly, when the battery is subjected to the stress leading to separation of the inner peripheral surface and the peripheral edge surface held in close contact, it is easier to disperse the stress in the bead and provide high weld strength.

In any one of the aforementioned batteries, preferably, the battery case has a rectangular parallelepiped shape, the case body has a bottom-closed rectangular cylindrical shape having the opening of a rectangular shape defined by a pair of opening long-side portions, a pair of opening short-side portions, and four opening rounded portions each curved in an arc shape joining the opening long-side portion and the opening short-side portion, the lid member has a rectangular plate-like shape having the lid peripheral edge part including a pair of lid long-side portions opposed respectively to the pair of opening long-side portions, a pair of lid short-side portions opposed respectively to the pair of opening short-side portions, and four lid rounded portions opposed respectively to the four opening rounded portions, and the specific section is a portion in which the pair of lid long-side portions are located in the circumferential direction of the lid member.

The above battery is a so-called rectangular battery, in which the specific section is defined by portions in which the pair of lid long-side portions in the circumferential direction of the lid member are located. Specifically, the battery can provide high weld strength in a welding area between the pair of opening long-side portions occupying a major part of the opening part of the rectangular battery and the pair of lid long-side portions of the lid member.

Another aspect of the invention provides a method for producing a battery including a metal battery case and an electrode body housed in the battery case, the battery case including; a case body having a closed-bottom cylindrical shape having an opening; and a plate-like shaped lid member inserted in the opening to close the opening, the opening of the case body and a lid peripheral edge part on a peripheral edge of the lid member being hermetically welded to each other over an entire circumference of the lid member by an energy beam irradiated from outside in a thickness direction of the lid member, wherein the method includes: an insertion step of inserting the lid member in the opening of the case body; and a welding step of irradiating an energy beam from outside in the thickness direction of the lid member to hermetically weld the opening of the case body and the lid peripheral edge part on the peripheral edge of the lid member, the welding step including in a specific section forming at least part of the lid member in a circumferential direction, bringing an inner peripheral surface of the opening of the case body, extending in the thickness direction, and a peripheral edge surface of the lid peripheral edge part of the lid member, extending in the thickness direction, into close contact state with each other, and wending so that a bead in the specific section has a shape like a fan having a central angle of 160 to 200° in cross section perpendicular to the circumferential direction of the bead, and a center of the fan shape is located on the inner peripheral surface and the peripheral edge surface.

According to the aforementioned method for producing the battery, the welding step following the inserting step includes welding the specific section in which the bead has a cross sectional shape of a nearly semicircular fan shape and the center thereof (a pivot portion of the fan shape) is located on the inner peripheral surface and the peripheral edge surface in a state where they are unmelted and held in close contact with each other. Thus, as described above, a closed pore is less likely to be formed due to hydrogen and others in the fan-like bead. In addition, even when bubbles are formed, they change into an open pore communicating with the inside of the battery case through the plate-like space mentioned above. This open pore is less likely to induce cracks to initiate therefrom. Rather, when the stress acting to separate the inner peripheral surface and the peripheral edge surface held in close contact is applied to the inner peripheral surface and the peripheral edge surface, it is possible to disperse the stress and prevent generation of cracks from the end portion of the plate-like space. That is, the open pore conversely makes it difficult to generate cracks. According to this battery producing method, consequently, the battery can be manufactured so that the specific section is less likely to contain the closed pore from which cracks are induced to initiate and provides high weld strength.

As described above, as the energy beam used in the welding step, there are a laser beam and an electronic beam. The laser beam is selectable from a CW laser such as a fiber laser and a pulse laser such as a YAG laser. In consideration of uniformity of weld spreading depth in a circumferential direction and others, the CW laser such as a fiber laser is preferably used. It is further preferable to design a beam to be irradiated with an increased spot diameter or a shortened focus distance of a lens for reducing a beam diameter so as to enable irradiation of the beam over a wide area of a welding area to be welded and melt the opening and others over the wider area. Furthermore, the beam may be irradiated over a wide range of a welding area by so-called weaving performed by swinging a laser beam in a direction perpendicular to a moving or advancing direction (a circumferential direction) of the laser beam while irradiating the laser beam.

Preferably, in the method for producing a battery, the welding step includes forming the bead in the specific section so that the bead protrudes more outward than an outside surface of the case body and protrudes more outward than an outside surface of the lid member.

According to this battery producing method, in the specific section, the bead is formed in the fan-like shape as mentioned above and designed to protrude more outward than the outside surface of the case body and protrude more outward than the outside surface of the lid member. Accordingly, when the battery is subjected to the stress leading to separation of the inner peripheral surface and the peripheral edge surface held in close contact, it is easier to disperse the stress in the bead and provide high weld strength.

Still further, in the method for producing a battery, preferably, the battery case has a rectangular parallelepiped shape, the case body has a bottom-closed rectangular cylindrical shape having the opening of a rectangular shape defined by a pair of opening long-side portions, a pair of opening short-side portions, and four opening rounded portions each curved in an arc shape joining the opening long-side portion and the opening short-side portion, the lid member has a rectangular plate-like shape having the lid peripheral edge part including a pair of lid long-side portions opposed respectively to the pair of opening long-side portions, a pair of lid short-side portions opposed respectively to the pair of opening short-side portions, and four lid rounded portions opposed respectively to the four opening rounded portions, and the welding step includes welding a portion, which is the specific section in which the pair of lid long-side portions in the circumferential direction of the lid member are located, by compressing the pair of opening long-side portions to each other to bring the inner peripheral surface of the opening long-side portion and the peripheral edge surface of the lid long-side portion into close contact state.

The above battery is a so-called rectangular battery, in which the specific section is defined by portions in which the pair of lid long-side portions in the circumferential direction of the lid member are located. Specifically, the battery can be produced with high weld strength in a welding area between the pair of opening long-side portions occupying a major part of the opening part of the rectangular battery and the pair of lid long-side portions of the lid member.

MODE FOR CARRYING OUT THE INVENTION

Figure 1:
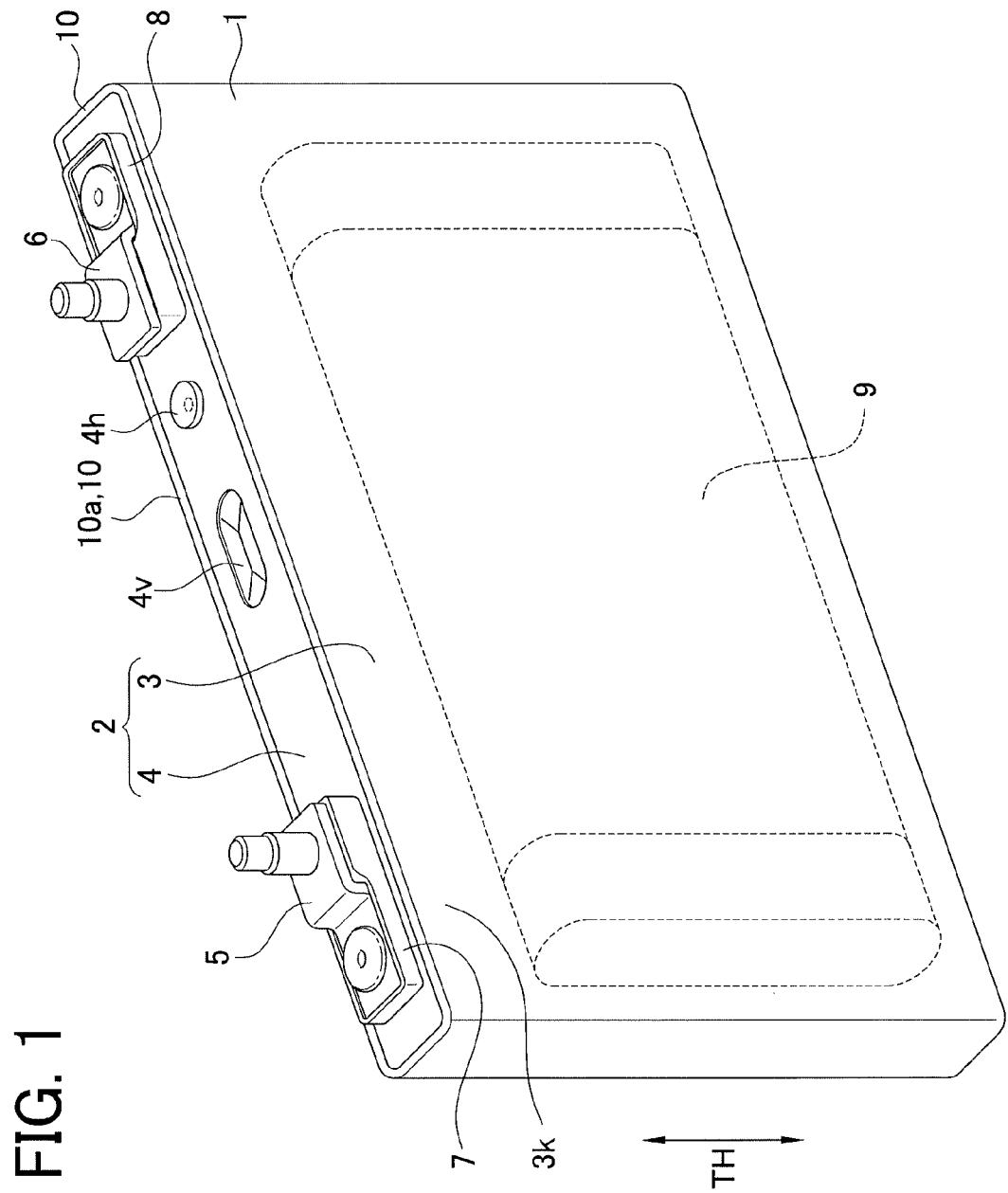
FIG. 1 is a perspective view of a lithium ion secondary battery in an embodiment.

A detailed description of a preferred embodiment of the present invention will now be given referring to the accompanying drawings. FIG. 1 is a lithium ion secondary battery 1 (hereinafter, also simply referred to as a battery 1) in the present embodiment. This battery 1 is a rectangular sealed battery to be mounted in a vehicle such as a hybrid vehicle and an electric vehicle or a battery using device such as a hammer drill. This battery 1 includes a rectangular parallelepiped battery case 2, a wound electrode body 9 of a flattened shape housed in this battery case 2, a positive electrode terminal 5 and a negative electrode terminal 6 each supported in the battery case 2, and others (see FIGS. 1 and 2). Further, a non-aqueous electrolyte (not shown) is retained in the battery case 2.

The electrode body 9 is enclosed sideways in the battery case 2 (see FIG. 1). This electrode body 9 is formed of a strip-shaped positive electrode sheet and a strip-shaped negative electrode sheet which are laminated one on the other by alternately interposing two strip-shaped separators, and wound together about an axis and compressed in a flattened shape. The electrode body 9 is connected to the positive electrode terminal 5 and the negative electrode terminal 6.

The battery case 2 will be explained below. This battery case 2 is made of metal (concretely, aluminum) and includes a case body 3 of a bottom-closed rectangular cylindrical shape having a rectangular opening part 3k opening only on the top side in FIG. 1, and a rectangular plate-like lid member 4 inserted in and welded to the opening part 3k of the case body 3 to hermetically close the opening part 3k (see FIGS. 1 to 3).

Figure 2:
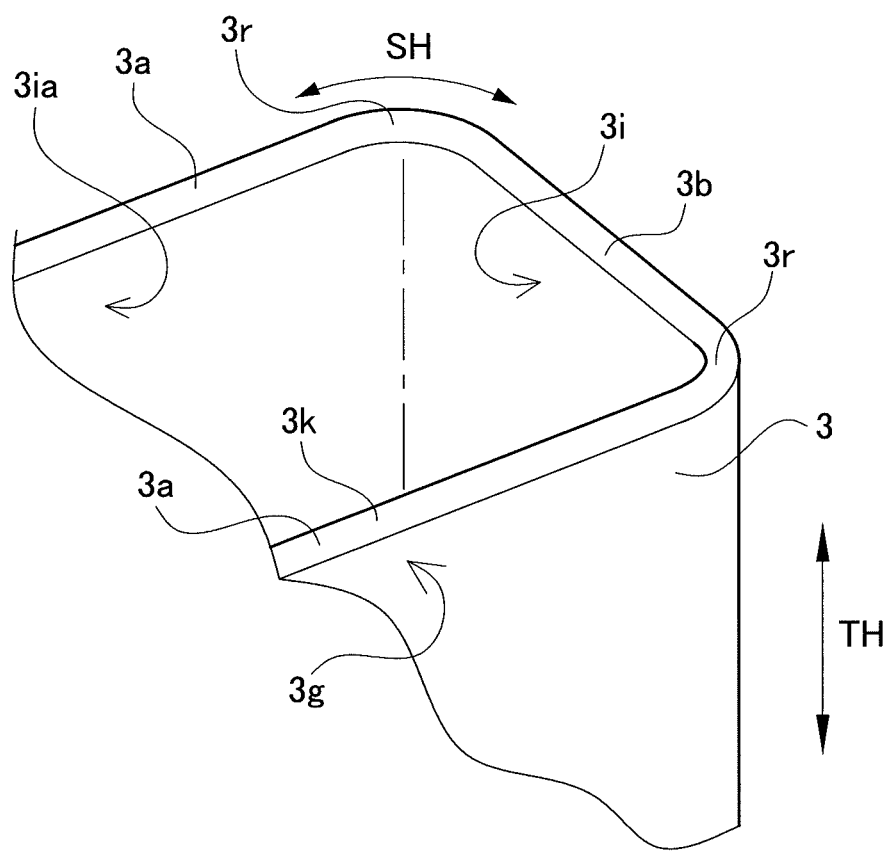
FIG. 2 is a partial enlarged perspective view showing a configuration of an opening part of a case body and its vicinity in the embodiment.
Figure 3:
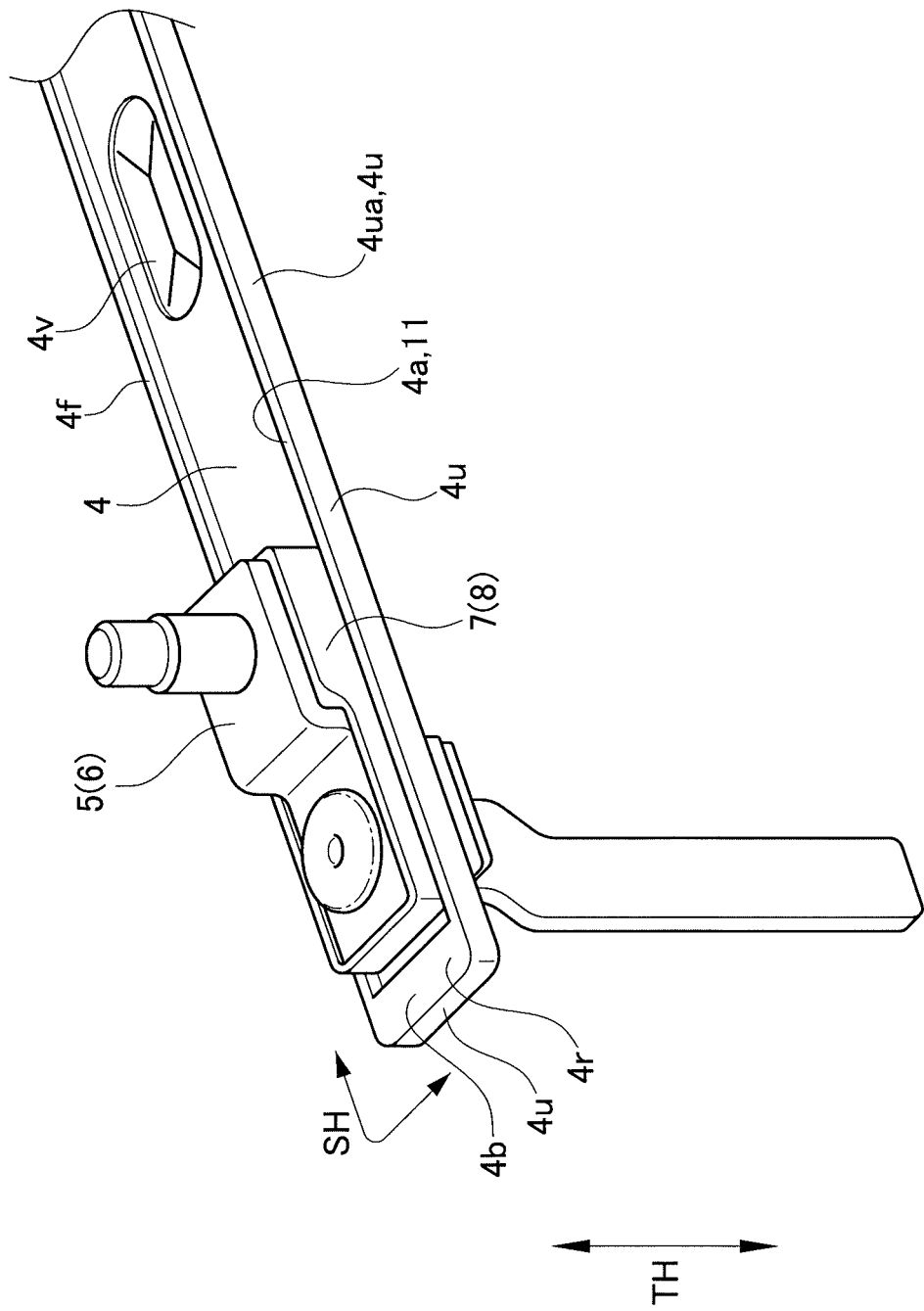
FIG. 3 is a partial enlarged perspective view showing a configuration of a lid member and others in the embodiment.

The rectangular opening part 3k of the case body 3 is defined by a pair of opening long-side portions 3a, 3a forming long sides of the rectangular shape, a pair of opening short-side portions 3b, 3b forming short sides, and four opening rounded portions 3r, 3r each curved in a ¼ arc joining the corresponding long-side portion 3a and short-side portion 3b (see FIG. 2).

On the other hand, in the lid member 4, a safety valve 4v of a non-returning type is provided at or near the center of the lid member 4 in its longitudinal direction (in a lower left to upper right direction in FIGS. 1 and 3) and a liquid inlet 4h used for injection of the electrolyte is provided near the safety valve 4 and sealed. Furthermore, in the lid member 4, near both ends in the longitudinal direction, the positive terminal 5 and the negative terminal 6 each extending out of the battery case 2 are provided under insulation using insulating members 7 and 8 respectively and fixed to the lid member 4 (the battery case 2). A lid peripheral edge part 4*f* located on the peripheral edge of the lid member 4 consists of a pair of lid long-side portions 4*a*, 4*a* forming long sides of the rectangular shape, a pair of lid short-side portions 4*b*, 4*b* forming short sides, and four lid rounded portions 4*r*, 4*r* each curved in a ¼ arc joining the corresponding long-side portions 4*a* and 4*b* (see FIG. 3). The lid long-side portions 4*a*, 4*a* are respectively opposed to the opening long-side portions 3*a*, 3*a* of the case body 3. The lid short-side portions 4*b*, 4*b* are respectively opposed to the opening short-side portions 3*b*, 3*b* of the case body 3. The lid rounded portions 4*r*, 4*r* are respectively opposed to the opening rounded portions 3*r*, 3*r* of the case body 3. The lid long-side portions 4*a* of the lid member 4 are welded to the opening long-side portions 3*a* of the case body 3 in close contact relation, that is, in a state where inner peripheral surfaces 3*ia* of the opening long-side portions 3*a* along a thickness direction TH, of an inner peripheral surface 3*i* of the opening part 3*k* of the case body 3, are held in close contact with peripheral edge surfaces 4*ua* of the lid long-side portions 4*a* along the thickness direction TH, of a peripheral edge surface 4*u* of the lid peripheral edge part 4*f* of the lid member 4 (see FIG. 5).

The case body 3 is hermetically closed by welding with the lid member 4. To be concrete, the opening part 3*k* of the case body 3 and the lid peripheral edge part 4*f* of the lid member 4 are welded to each other over the entire circumference of the lid member 4 in a circumferential direction SH by an energy beam (concretely, a laser beam) LS irradiated from outside (from above the lid member 4) in the thickness direction TH of the lid member 4. That is, the opening part 3*k* and the lid peripheral edge part 4*f* are hermetically joined to each other over the entire circumference via a bead 10 formed of part of the opening part 3*k* and part of the lid peripheral edge part 4*f* that are melted once and then solidified.

Figure 5:
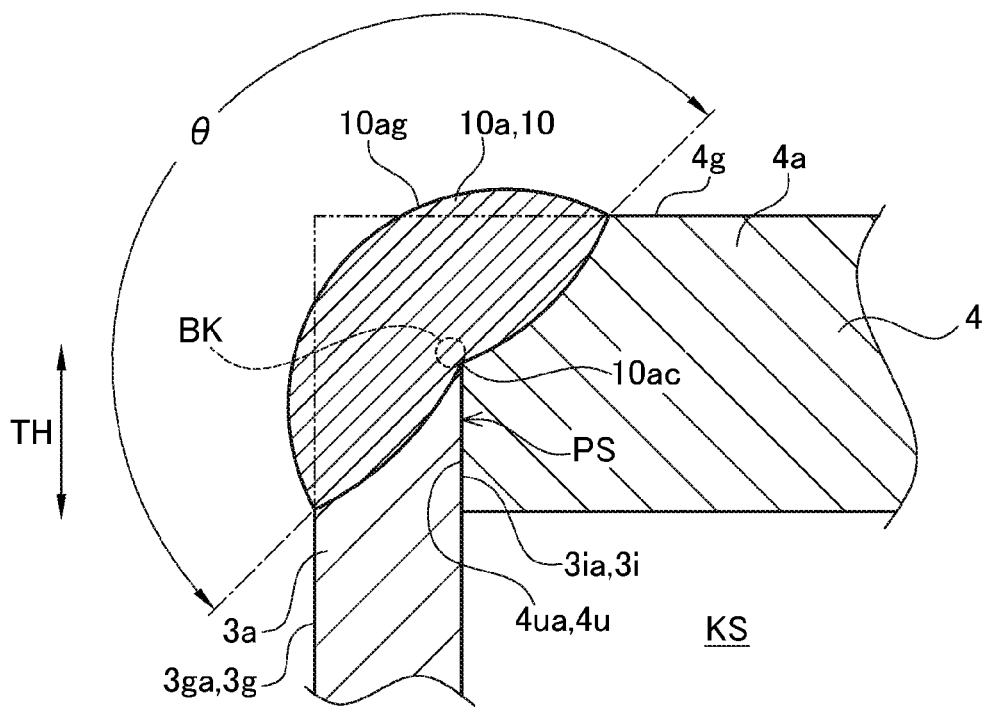
FIG. 5 is a partial enlarged cross sectional view showing a welded state of the opening long-side portion of the case body and the lid long-side portion in the embodiment.

The battery 1 in the present embodiment is configured such that, of the bead 10, a bead 10*a* in a specific section 11, concretely, in portions corresponding to the lid long-side portions 4*a* of the lid member 4 in the circumferential direction SH, has a cross sectional shape in a direction perpendicular to the circumferential direction SH (a direction perpendicular to the long sides in the present embodiment), which is shown by inspection in FIG. 5. Specifically, the bead 10*a* in this specific section 11 schematically has an outer surface 10*ag* of a circular arc shape, which is a fan-like shape centered at a center 10*ac* and shaped in an almost semicircular form with a central angle θ=180°. In addition, this bead 10*a* is formed with the center 10*ac* located on the inner peripheral surface 3*i* of the opening long-side portion 3*a* and the peripheral edge surface 4*ua* of the peripheral edge surface 4*ua* held in close contact with each other.

In this specific section 11, the bead 10*a* has a shape expanding more outward (leftward in FIG. 5) than an outside surface 3*ga* of the opening long-side portion 3*a*, of an outside surface 3*g* of the case body 3, and more outward (upward in FIG. 5) than an outside surface 4*g* (an upper surface in FIG. 5) of the lid member 4.

In the bead 10*a*, a pore or pores may be formed. In the battery 1 in the present embodiment, however, the pore(s) formed in the bead 10*a* is generated near the fan-shape center 10*ac* as indicated by a broken line in FIG. 5. This pore becomes an open pore BK continuous with plate-like space PS slightly formed between the inner peripheral surface 3*ia* of the opening long-side portion 3*a* and the peripheral edge surface 4*ua* of the lid long-side portion 4*a*.

A method for producing this battery 1 will be explained below. Firstly, the positive terminal 5 and the negative terminal 6 are fixed to the lid member 4 through the insulating members 7 and 8 (see FIGS. 1 and 2). Secondly, the positive terminal 5 and the negative terminal 6 are respectively connected (welded) to the electrode body 9 separately produced. The case body 3 is also prepared. In an inserting step, the electrode body 9 is inserted in the case body 3 and also the lid member 4 is inserted in the opening part 3*k* of the case body 3.

In a welding step, subsequently, prior to welding, the pair of opening long-side portions 3*a*, 3*a* of the case body 3 are respectively pressed inward (an upper left to lower right direction in FIG. 1), thereby bringing the opening long-side portions 3*a*, 3*a* into close contact with the pair of lid long-side portions 4*a*, 4*a* of the lid member 4 (see FIG. 4). To be concrete, of the inner peripheral surface 3*i* of the opening part 3*k* of the case body 3, the inner peripheral surfaces 3*ia* of the opening long-side portions 3*a* are placed in close contact with the peripheral edge surfaces 4*ua* of the lid long-side portions 4*a*, of the peripheral edge surface 4*u* of the lid peripheral edge part 4*f* of the lid member 4. However, even when the inner peripheral surfaces 3*ia* of the opening long-side portions 3*a* and the peripheral edge surfaces 4*ua* of the lid long-side portions 4*a* are pressed against each other, their surfaces having asperities (projections and depressions) and thus they cannot be perfectly placed in tight contact with each other without gaps. Therefore, between the inner peripheral surfaces 3*ia* of the opening long-side portions 3*a* and the corresponding peripheral edge surfaces 4*ua* of the lid long-side portions 4*a*, the plate-like space PS having slight thickness is formed. This space PS is communicated with internal space KS (the space surrounded by the case body 3 and the lid member 4) of the battery case 2.

Figure 4:
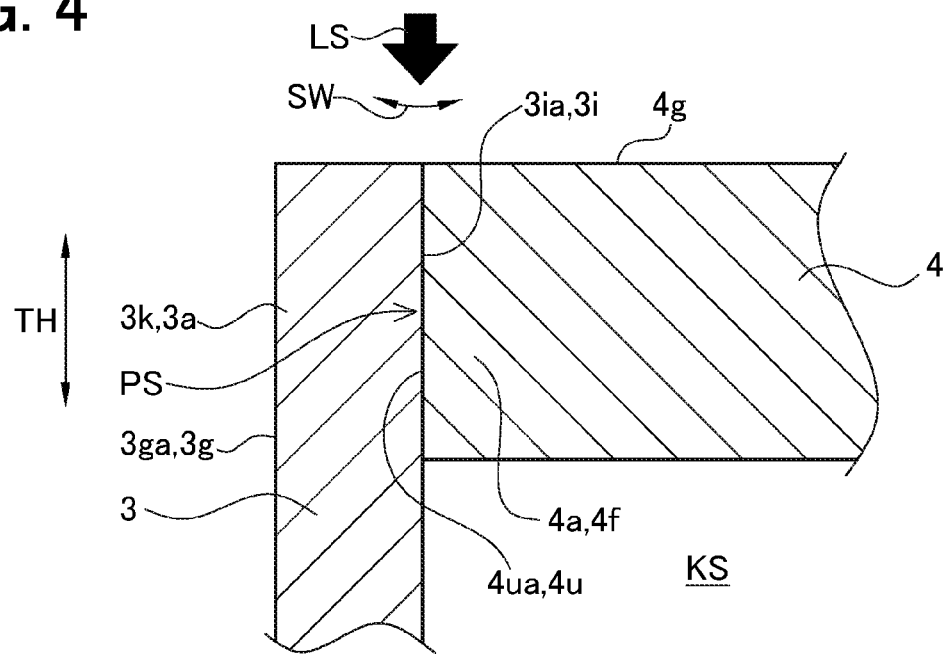
FIG. 4 is a partial enlarged cross sectional view showing a relationship between an opening long-side portion of the case body and a lid long-side portion before welding in the embodiment.

Thereafter, while maintaining this state of the case body 3 and the lid member 4, the laser beam LS is irradiated from outside in the thickness direction of the lid member 4 (from above the lid member 4), traveling in a direction perpendicular to the lid member 4 (downward in FIG. 4). To be concrete, the laser beam LS is irradiated to a portion on or around the boundary between the inner peripheral surface 3*i* of the opening part 3*k* of the case body 3 and the peripheral edge surface 4*u* of the lid peripheral edge part 4*f* of the lid member 4 (i.e., the boundary between the inner peripheral surface 3*ia* of the opening long-side portion 3*a* and the peripheral edge surface 4*ua* of the lid long-side portion 4*a* in FIG. 4). Accordingly, the opening part 3*k* of the case body 3 and the lid peripheral edge part 4*f* of the lid member 4 are welded to each other over the entire circumference (see FIG. 4).

For irradiation of this laser beam LS, a fiber laser including an optical fiber as a medium is used as a CW laser (continuous wave laser) that continuously emits a laser beam. In the present embodiment, while the laser beam LS is irradiated by being relatively moved with respect to the battery case 2 (the case body 3 and the lid member 4) along the circumferential direction SH of the lid member 4, so-called weaving welding is performed by swing the laser beam LS to change the irradiation direction of the laser beam LS in a swinging direction SW (see an arrow in FIG. 4) perpendicular to a moving direction. This can perform welding over a wider range as compared with the case of irradiating the laser beam LS without swinging. In addition, during irradiation of the laser beam LS, shield gas such as nitrogen gas (not shown) is blown against a portion being irradiated with the laser beam LS in order to prevent oxidation and cool the bead 10 (a molten portion).

Accordingly, part of the opening part 3k and part of the lid peripheral edge part 4f are melted and then solidified, forming the bead 10 of a rectangular frame-like shape in plan view. Through this bead 10, the opening part 3k and the lid peripheral edge part 4f are hermetically joined to each other over the entire circumference (see FIG. 1). Furthermore, in the areas defined as the aforementioned specific sections 11 corresponding to the lid long-side portions 4a of the lid member 4 in the circumferential direction SH, the bead 10a having a fan-like shape as mentioned above is formed (see FIG. 5). However, the open pore BK may be generated in this bead 10a in the specific section 11 as explained above.

Thereafter, the electrolyte (not shown) is poured into the battery case 2 through the liquid inlet 4h and then the liquid inlet 4h is hermetically closed. The battery 1 is thereafter subjected to initial charge, aging, and various tests. Thus, the battery 1 is finished.

In manufacture of the battery 1, the above-described welding may cause the following phenomenon. Specifically, when the case body 3 and the lid member 4 are welded by moving the laser beam LS, even still unmelted portions of the opening part 3k of the case body 3 and the lid peripheral edge part 4f of the lid member 4 also receive heat by irradiation of the laser beam LS and thus their temperatures rise due to such heat conduction. It is thus conceived that, when the bead 10 (10a) melted by irradiation of the laser beam LS is being cooled and gradually solidified, the heat relatively less moves by heat conduction from the molten bead 10 to the case body or the lid member. On the other hand, it is conceived that much heat transfers from the surface of the molten bead 10 to air or shield gas contacting therewith or much heat dissipates from the surface of the molten bead 10 due to heat emission by infrared rays.

In addition, in each of the specific sections 11 (the portions in which the pair of lid long-side portions 4a in the circumferential direction SH of the lid member 4 are located), as mentioned above, the bead (molten metal) 10a takes a fan-like shape having a nearly semicircular form (see FIG. 5). Therefore, the bead 10a gets cooled almost uniformly from the outer peripheral surface 10ag side of the bead 10a and becomes solidified from the outer peripheral surface 10ag of a circular arc shape in cross section toward the center 10ac of a fan-like shape. In association with this solidification, fine bubbles or the like contained in the molten aluminum (the bead 10a) deriving from the hydrogen in aluminum or the water or moisture contained in the air taken in during welding are also moved toward the fan-shape center 10ac. Finally, the fine bubbles accumulate at or around the fan-shape center 10ac.

In the battery 1 in the present embodiment, therefore, in each of the specific sections 11, the fan-shape center 10ac is located on the inner peripheral surface 3ia of the opening long-side portion 3a and the peripheral edge surface 4ua of the lid long-side portion 4a. On the other hand, in this area, the inner peripheral surface 3ia of the opening long-side portion 3a and the peripheral edge surface 4ua of the lid long-side portion 4a are in close contact with each other, whereas the slight plate-like space PS is formed therebetween. This space PS is continuous with the internal space KS of the battery case 2. Accordingly, hydrogen and others contained in the fine bubbles are released into this plate-like space PS and then into the internal space KS through the space PS. Thus, a closed pore is unlikely to be formed by the hydrogen and others in the fan-shaped bead 10a.

Even if the hydrogen and others contained in the fine bubbles are not sufficiently released into the plate-like space PS, the battery 1 is configured such that the fan-shape center 10ac of the bead 10a is located on the inner peripheral surface 3ia of the opening long-side portion 3a and the peripheral edge surface 4ua of the lid long-side portion 4a. At the stage when the fine bubbles accumulate at or near the center 10ac, forming a large bubble, this large bubble is communicated with the above plate-like space PS. In other words, the large bubble formed of the accumulated fine bubbles forms the open pore BK continuous with the plate-like space PS and hence communicating with the internal space KS of the battery case 2 through the space PS.

A method for producing a battery 20 in a comparative example will be explained referring to FIG. 6. This manufacture of the battery 20 in the comparative example is different from the above embodiment only in the irradiation of the laser beam LS performed without weaving (swinging), that is, the laser beam LS is irradiated by concentrating the energy thereof at a narrow range and moving along the circumferential direction SH of the lid member 4 to weld the lid member 4. In the battery 20 in this comparative example, accordingly, a bead 21a in a specific section 11 is formed with a cross sectional shape shown in FIG. 6. Specifically, a portion exposed to the laser beam LS is more deeply melted as compared with the bead 10a (see FIG. 5) of the battery 1 in the embodiment, whereas other portions are melted relatively shallowly. Regarding the cross sectional shape of beads, the bead 10a in the embodiment has a nearly semicircular fan-like shape, whereas the bead 21a in the comparative example has a distorted shape as illustrated in the figure.

This bead 21a has such a shape that expands more outward (leftward in FIG. 5) than the outside surface 3ga of the case long-side portion 3a, of the outside surface 3g of the case body 3, but does not expand more outward (leftward in FIG. 5) than the outside surface (the upper surface in FIG. 5) 4g of the lid member 4.

Figure 6:
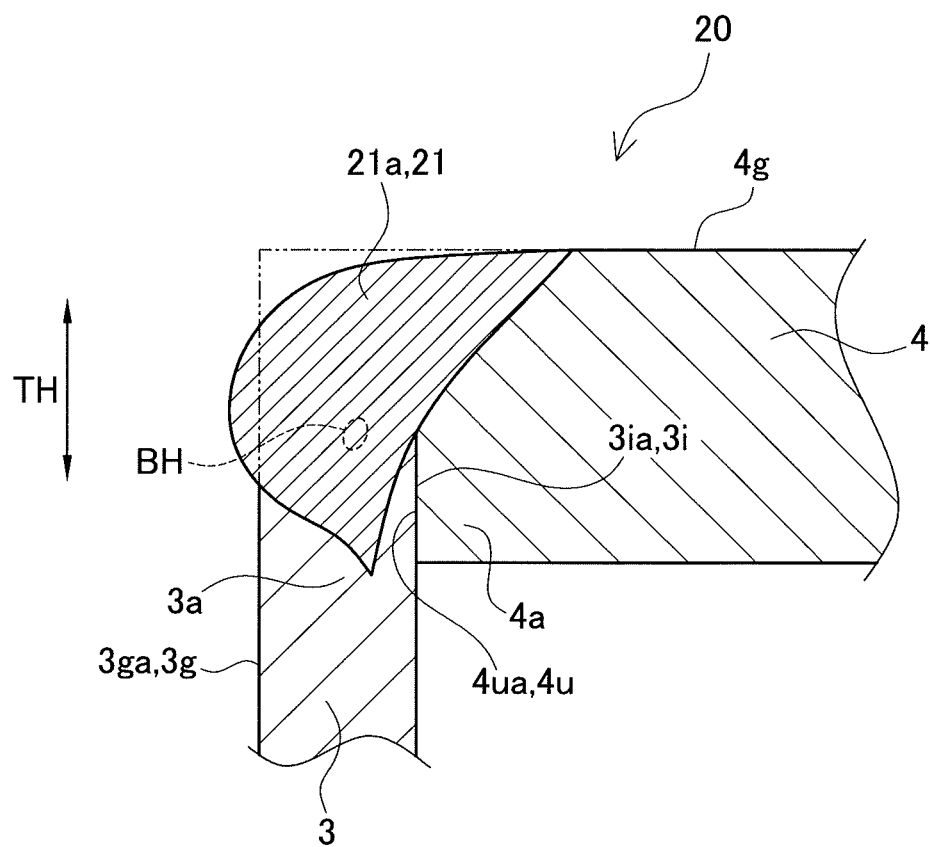
FIG. 6 is a partial enlarged cross sectional view showing a welded state of an opening long-side portion of a case body and a lid long-side portion in a comparative example.

Furthermore, there are cases where the bead 21a in the comparative example is formed therein with a closed pore BH shown by a broken line in FIG. 6. In case such a closed pore BH is present in the bead 21a, when stress is applied to the battery case 2, e.g., when the internal pressure of the battery case 2 rises, the closed pore BH is apt to become a weak point in the bead 21a. For example, the closed pore BH may induce cracks to initiate therefrom or generate cracks as if connecting the closed pore BH and an end edge of the space PS formed between the inner peripheral surface 3ia of the opening long-side portion 3a of the case body 3 and the peripheral edge surface 4ua of the lid long-side portion 4a of the lid member 4 and further allow the cracks to grow via the closed pore BH.

Therefore, the battery case 2 of the battery 1 in the embodiment and the battery case 2 of the battery 20 in the comparative example were subjected to the following examination on durability of respective welding areas. Specifically, a pipe is connected to the battery case 2 subjected to welding in the embodiment or in the comparative example, and air is pressed into the case or air is sucked out of the case, thereby repeating changing of the internal pressure of the battery case 2. The number of cycles until cracks occur in the battery case 2 (the weld beads 10 and 21) was measured. Since the battery case 2 is of a rectangular parallelepiped shape shown in FIG. 1, due to changes in internal pressure of each case, stress is apt to concentrate at the specific section 11 which is a portion of each bead 10, 21 formed in a rectangular frame-like shape, in which the lid long-side portion 4a in the circumferential direction SH of the lid member 4 is located. In particular, the stress is likely to concentrate on or around the center of the lid long-side portion 4a. Accordingly, in any of the battery cases 2, cracks were caused in the beads 10a and 21a in the specific sections 11, particularly in the beads 10a and 21a on or around the center of the lid long-side portions 4a.

Figure 7:
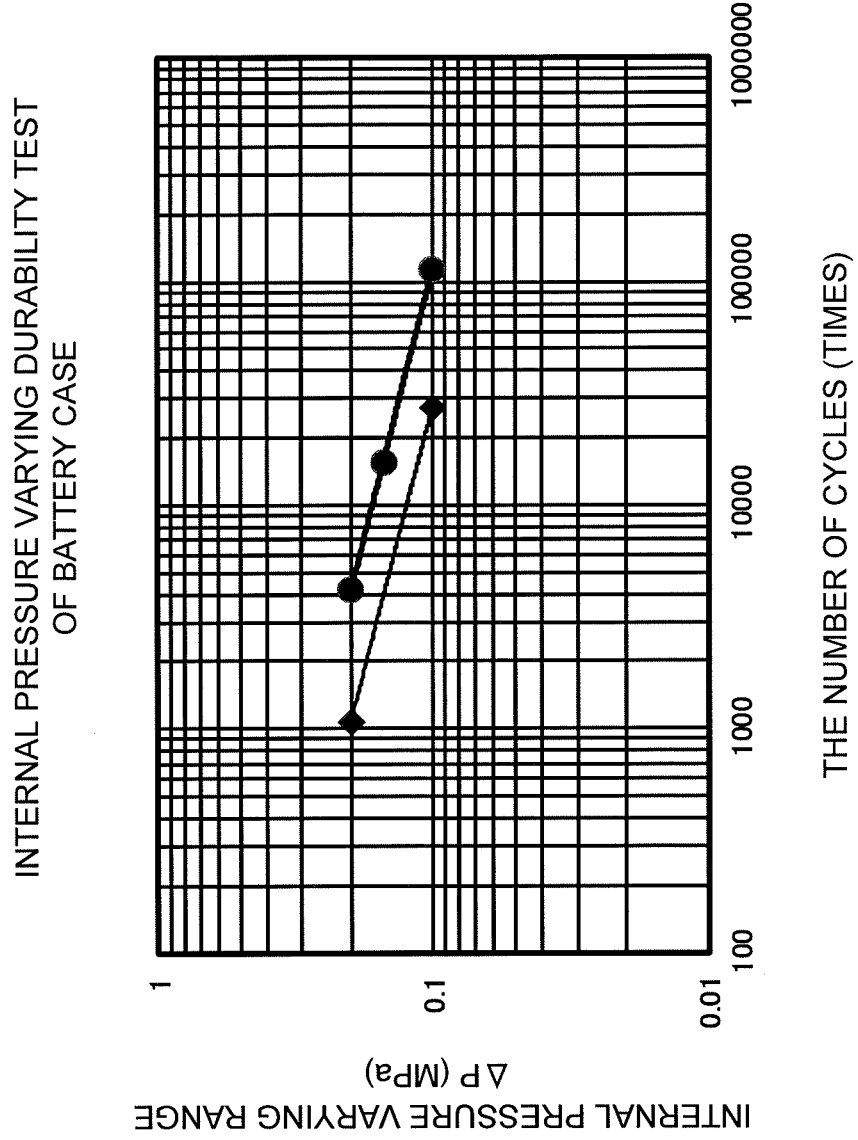
FIG. 7 is a graph showing durability test results on battery cases in the embodiment and the comparative example, with respective internal pressures being repeatedly changed.

The results are shown in FIG. 7. In this FIG. 7, a mark ● represents a result of a durability test on the battery case 2 in the embodiment and a mark ♦ represents a result of a durability test on the battery case in the comparative example. The number of samples is each five.

For the battery case 2 in the embodiment, the internal pressure varying range ΔP is set to 0.10 MPa, 0.15 MPa, and 0.20 MPa. On the other hand, for the battery case 2 in the comparative example, the internal pressure varying range ΔP is set to 0.10 MPa and 0.20 MPa. As readily understood from those results, it is found that in both the battery cases 2 in the embodiment and the comparative example, as the internal pressure varying range ΔP is set larger, the number of cycles performed until cracks occur in the bead 10a or 21a is sharply smaller. However, it is found that the battery case (mark ●) in the embodiment could provide the durability that could endure the number of cycles four times or more as compared with the battery case (mark ♦) in the comparative example. Those results reveal that the battery 1 in the embodiment could achieve high durability in the weld of the battery case 2 (the case body 3 and the lid member 4), particularly in the specific sections 11.

The reasons that cause the above difference are conceived as below. In the bead 21a in the battery 20 in the comparative example, hydrogen and others in the fine bubbles are less likely to release out and thus a large closed pore BH is likely to occur in the bead 21a. If the closed pore BH is preset in the bead 21a, when stress is applied to the battery case due to change in internal pressure or the like, cracks are induced to be generated to extend from the closed pore BH as a start point or extend toward the closed pore BH.

In the bead 10a in the battery 1 in the embodiment, as mentioned above, the hydrogen in the fine bubbles is easily released into the space PS, leading to less generation of a closed pore. Furthermore, even when bubbles are generated, they are conceived to become the open pore BK communicating with the space PS mentioned above. Such configured open pore BK is less likely to induce cracks to be generated therefrom, differently from the closed pore BH (see FIG. 6) formed in the bead 21a. Rather, in the bead 10a having such open pore BK, a nearly round cutout is formed by the open pore BK at the end edge of the plate-like space PS apt to become a start point from which a crack is induced to initiate. Accordingly, even when the internal pressure of the battery case changes (e.g., increases), applying the stress acting to separate the inner peripheral surface 3ia and the peripheral edge surface 4ua held in close contact relation as in the aforementioned internal pressure varying test, it is possible to disperse the stress to prevent generation of cracks from the end edge of the plate-like space PS. In the battery 1 in the embodiment, specifically, it is conversely conceived that the presence of the open pore BK makes it difficult to generate cracks.

According to the battery 1 and the method for producing the same in the present embodiment mentioned above, this battery 1 can be provided as a battery 1 unlikely to include the closed pore BH apt to induce cracks to be generated therefrom in the bead 10a in the specific section 11 (a portion in which the lid long-side portion 4a in the circumferential direction SH of the lid member 4 is located), and thus providing high weld strength. According to the method for producing the battery 1 described above, furthermore, the battery 1 can be produced so that the bead 10a less likely to contain a closed pore apt to induce generation of cracks to initiate therefrom is formed, and thus provide high weld strength.

In the battery 1 in the present embodiment, particularly, each specific section 11 is configured such that the bead 10a has the fan-like shape mentioned above (see FIG. 5), and this bead 10a protrudes more outward than the outside surface 3g (the outside surface 3ga of the opening long-side portion 3a) of the case body 3 and protrudes more outward than the outside surface 4g of the lid member 4. Accordingly, when the battery is subjected to the stress leading to separation of the inner peripheral surface 3ia and the peripheral edge surface 4ua held in close contact relation, it is easier to disperse the stress in the bead 10a, so that the battery 1 can provide higher weld strength. The method for producing the battery 1 in the present embodiment can manufacture the battery 1 configured to allow easier dispersion of the stress in the bead 10a and provide high weld strength.

Furthermore, the battery 1 in the present embodiment is a so-called rectangular battery, in which the portions in which the pair of lid long-side portions 4a in the circumferential direction SH of the lid member 4 are located are defined as the specific sections 11. Specifically, the battery 1 has high weld strength in the welding area between the pair of opening long-side portions 3a occupying a major part of the opening part 3k of the rectangular battery 1 and the pair of lid long-side portions 4a of the lid member 4. Moreover, this battery 1 can be produced.

The present invention is explained above in the embodiment, but is not limited thereto. The invention may be embodied in other specific forms without departing from the essential characteristics thereof. In the above embodiment, for instance, the weaving welding performed by swinging a laser beam LS is conducted by irradiating a beam over a wide range of a portion to be welded, thereby enabling melting of the opening part and others over the wide range. Instead thereof, however, it may be arranged to increase a spot diameter of the laser beam LS or shorten a focus distance of a lens for reducing a beam diameter to enable irradiation of the beam over a wide area of the weld portion. Although the present embodiment exemplifies the use of the laser beam LS, an electronic beam may be used for welding.

REFERENCE SIGNS LIST 1, 20 Lithium ion secondary battery (Rectangular battery)
2 Battery case
3 Case body
3k Opening part
3a Opening long-side portion
3b Opening short-side portion
3r Opening rounded portion
3i Inner peripheral surface (of Opening part)
3ia Inner peripheral surface (of Opening long-side portion)
3g Outside surface (of Case body)
3ga Outside surface (of Opening long-side portion)
4 Lid member
4f Lid peripheral edge part
4a Lid long-side portion (Specific portion)
4b Lid short-side portion
4r Lid rounded portion
4u Peripheral edge surface (of Lid peripheral edge part)

4*ua* Peripheral edge surface (of Lid long-side portion)
4*g* Outer side surface (of Lid peripheral edge part)
9 Electrode body
10, 21 Bead
10*a*, 21*a* Bead (in Specific portion)
10*ag* Outer peripheral surface (of Bead in Specific portion)
10*ac* Center of fan shape (of Bead in Specific portion)
θ Central angle (of Fan-like shape)
11 Specific portion
BK Open pore
BH Closed pore
LS Energy beam (Laser beam)
TH Thickness direction (of Lid member)
SH Circumferential direction (of Lid member)

The invention claimed is:

1. A battery including a metal battery case and an electrode body housed in the battery case,
the battery case including;
a case body having a closed-bottom cylindrical shape having an opening; and
a plate-like shaped lid member inserted in the opening to close the opening,
the opening of the case body and a lid peripheral edge part on a peripheral edge of the lid member being hermetically welded to each other over an entire circumference of the lid member by an energy beam irradiated from outside in a thickness direction of the lid member,
wherein
in a specific section forming at least a part of the lid member in a circumferential direction,
an inner peripheral surface of the opening of the case body, extending in the thickness direction and a peripheral edge surface of the lid peripheral edge part of the lid member, extending in the thickness direction are welded in close contact with each other,
a bead in the specific section has a shape like a fan having a central angle of 160 to 200° in cross section perpendicular to the circumferential direction of the bead,
a center of the fan shape is located on the inner peripheral surface and the peripheral edge surface, and
the bead in the specific section is configured to protrude more outward than an outside surface of the case body and protrude more outward than an outside surface of the lid member.

2. The battery according to claim 1, wherein
the battery case has a rectangular parallelepiped shape,
the case body has a bottom-closed rectangular cylindrical shape having the opening of a rectangular shape defined by a pair of opening long-side portions, a pair of opening short-side portions, and four opening rounded portions each curved in an arc shape joining the opening long-side portion and the opening short-side portion,
the lid member has a rectangular plate-like shape having the lid peripheral edge part including a pair of lid long-side portions opposed respectively to the pair of opening long-side portions, a pair of lid short-side portions opposed respectively to the pair of opening short-side portions, and four lid rounded portions opposed respectively to the four opening rounded portions, and
the specific section is a portion in which the pair of lid long-side portions are located in the circumferential direction of the lid member.

3. A method for producing a battery including a metal battery case and an electrode body housed in the battery case,
the battery case including;
a case body having a closed-bottom cylindrical shape having an opening; and
a plate-like shaped lid member inserted in the opening to close the opening,
the opening of the case body and a lid peripheral edge part on a peripheral edge of the lid member being hermetically welded to each other over an entire circumference of the lid member by an energy beam irradiated from outside in a thickness direction of the lid member,
wherein the method includes:
an insertion step of inserting the lid member in the opening of the case body; and
a welding step of irradiating an energy beam from outside in the thickness direction of the lid member to hermetically weld the opening of the case body and the lid peripheral edge part on the peripheral edge of the lid member,
the welding step including
in a specific section forming at least part of the lid member in a circumferential direction,
bringing an inner peripheral surface of the opening of the case body, extending in the thickness direction, and a peripheral edge surface of the lid peripheral edge part of the lid member, extending in the thickness direction, into close contact state with each other, and
welding so that a bead in the specific section has a shape like a fan having a central angle of 160 to 200° in cross section perpendicular to the circumferential direction of the bead, and a center of the fan shape is located on the inner peripheral surface and the peripheral edge surface, and the bead in the specific section protrudes more outward than an outside surface of the case body and protrudes more outward than an outside surface of the lid member.

4. The method for producing a battery according to claim 3, wherein
the battery case has a rectangular parallelepiped shape,
the case body has a bottom-closed rectangular cylindrical shape having the opening of a rectangular shape defined by a pair of opening long-side portions, a pair of opening short-side portions, and four opening rounded portions each curved in an arc shape joining the opening long-side portion and the opening short-side portion,
the lid member has a rectangular plate-like shape having the lid peripheral edge part including a pair of lid long-side portions opposed respectively to the pair of opening long-side portions, a pair of lid short-side portions opposed respectively to the pair of opening short-side portions, and four lid rounded portions opposed respectively to the four opening rounded portions, and
the welding step includes welding a portion, which is the specific section in which the pair of lid long-side portions in the circumferential direction of the lid member are located, by compressing the pair of opening long-side portions to each other to bring the inner peripheral surface of the opening long-side portion and the peripheral edge surface of the lid long-side portion into close contact state.

* * * * *